(12) United States Patent
Hall

(10) Patent No.: US 7,103,776 B1
(45) Date of Patent: Sep. 5, 2006

(54) EMERGENCY LOGON METHOD

(75) Inventor: Frederick M. Hall, Ann Arbor, MI (US)

(73) Assignee: ACUSON, Mountain View, CA (US)

( * ) Notice: Subject to any disclaimer, the term of this patent is extended or adjusted under 35 U.S.C. 154(b) by 1035 days.

(21) Appl. No.: 10/062,685

(22) Filed: Jan. 31, 2002

(51) Int. Cl.
*H04L 9/32* (2006.01)
*H04M 1/66* (2006.01)

(52) U.S. Cl. ............... 713/182; 455/404.1; 455/411

(58) Field of Classification Search ............ 713/182; 455/404.1, 411
See application file for complete search history.

(56) References Cited

U.S. PATENT DOCUMENTS 6,073,106 A * 6/2000 Rozen et al. ............... 705/3
2002/0001367 A1 * 1/2002 Lee ............................. 379/41
2002/0194131 A1 * 12/2002 Dick ............................ 705/51
2003/0074564 A1 * 4/2003 Peterson .................... 713/182
2003/0220817 A1 * 11/2003 Larsen et al. ................ 705/2

* cited by examiner

*Primary Examiner*—Matthew Smithers
(74) *Attorney, Agent, or Firm*—Alexander J. Burke

(57) ABSTRACT

The preferred embodiments described herein provide a method for emergency logon. In one preferred embodiment, a method for emergency logon is described comprising the acts of providing a logon process that collects identification information and authentication information and provides access when identification information is authenticated by authentication information; receiving a request for emergency logon from an entity; collecting identification information from the entity; and without authenticating the identification information collected from the entity, providing the entity with emergency access. Other preferred embodiments are provided, and each of the preferred embodiments described herein can be used alone or in combination with one another.

31 Claims, 4 Drawing Sheets

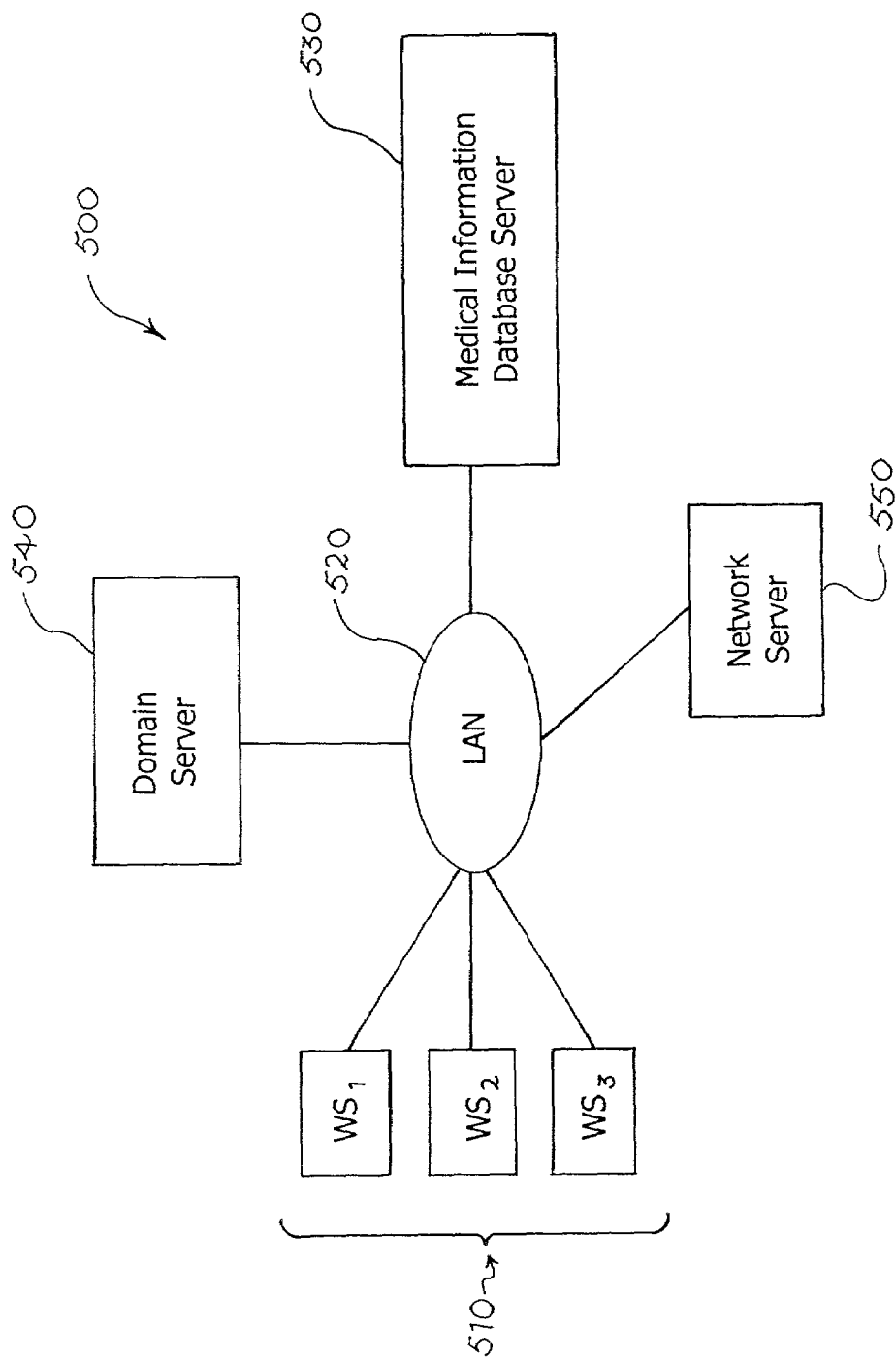

EMERGENCY LOGON METHOD

BACKGROUND

Logon processes have been used as security mechanisms to restrict access to a resource. In operation, a logon process collects identification and authentication information from an entity desiring access. Typically, the identification information takes the form of a username, and the authentication information takes the form of a password. If the username and password combination is recognized, the entity is provided access to the resource.

In some situations, it is desired to provide access to entities even if they cannot provide a valid username and password. For example, the Health Insurance Portability and Accountability Act (HIPAA) of 1996 can be interpreted as requiring a logon process that prevents unauthorized entities from gaining access to a computer-based medical information system but does not prevent a health care provider from obtaining necessary information from the system during a crisis. For example, in an emergency when no administrators are available for help, a physician or other health care provider must be able to logon to a medical information system even if he has not been assigned or cannot remember a valid username and password. One approach to satisfying this conflicting requirement is to establish a reserved but not widely-known username and password combination, such as a username "emergency" that requires the password "emergency," that will provide access to an entity in an emergency. There are several shortcomings to this approach. First, an entity may not be able to remember the reserved username and password combination in a time of emergency. Additionally, a reserved username and password such as "emergency" "emergency" does not provide an administrator with the identity of the entity who invoked the emergency logon.

SUMMARY

The present invention is defined by the following claims, and nothing in this section should be taken as a limitation on those claims.

By way of introduction, the preferred embodiments described below provide a method for emergency logon. In one preferred embodiment, a method for emergency logon is described comprising the acts of providing a logon process that collects identification information and authentication information and provides access when identification information is authenticated by authentication information; receiving a request for emergency logon from an entity; collecting identification information from the entity; and without authenticating the identification information collected from the entity, providing the entity with emergency access. Other preferred embodiments are provided, and each of the preferred embodiments described herein can be used alone or in combination with one another.

The preferred embodiments will now be described with reference to the attached drawings.

BRIEF DESCRIPTION OF THE DRAWINGS

FIG. 5 is an illustration of a network of a preferred embodiment.

DETAILED DESCRIPTION OF THE PRESENTLY PREFERRED EMBODIMENTS

By way of introduction, a logon process can be used to provide access to authenticated entities. As used herein, the term "access" refers to the ability to read, write, modify, and/or communicate data and/or to otherwise make use of a system resource. A logon process can require an entity (i.e., a person attempting to gain access) to provide information to identify himself ("identification information") and information that will be used to corroborate that the entity is the person who he is claiming to be ("authentication information"). To authenticate the entity, the logon process checks the identification and authentication information collected from the entity against a database of known entities. If the collected identification information and authentication information are correlated in the database, the identification information is authenticated by the authentication information, and the entity is provided access. This process will be referred to herein as "normal logon." An entity who gains access by providing a logon process with identification information and authentication information that authenticates the identification information will be referred to as an authenticated entity. An unauthenticated entity is an entity who cannot or chooses not to gain access this way.

Figure 1:
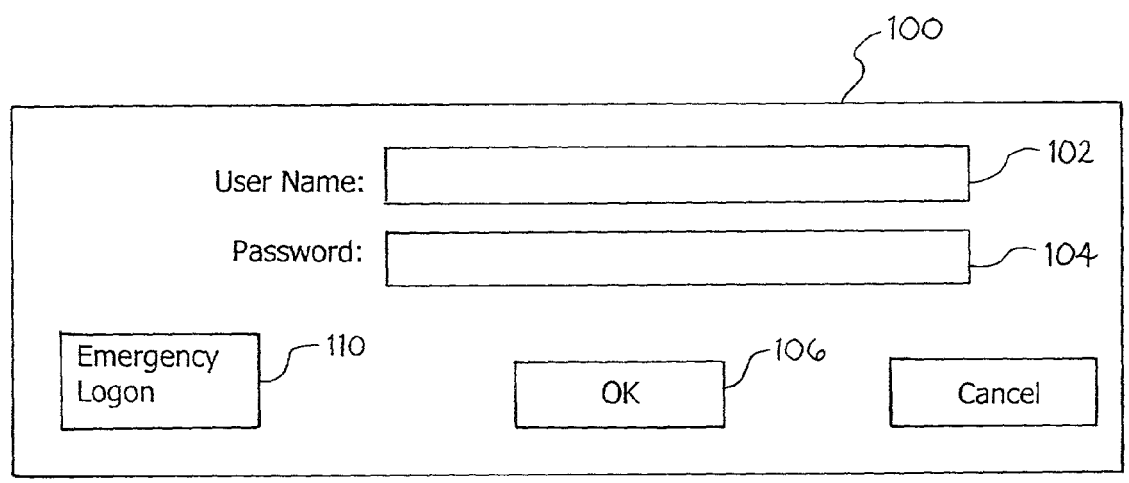
FIG. 1 is an illustration of a logon screen of a logon process of a preferred embodiment.

Turning now to the drawings, FIG. 1 is an illustration of a logon screen 100 of a logon process of a preferred embodiment. In this preferred embodiment, the identification information takes the form of a username, and the authentication information takes the form of a password. As described below, identification and authentication information can take many other forms. In operation, an entity desiring access types his username and password into the username and password fields 102, 104 in the logon screen 100 and clicks the "ok" button 106. During the authentication process, a database of known usernames and passwords is queried, and the entity is provided access if the entered username and password combination is found in the database.

Figure 2:
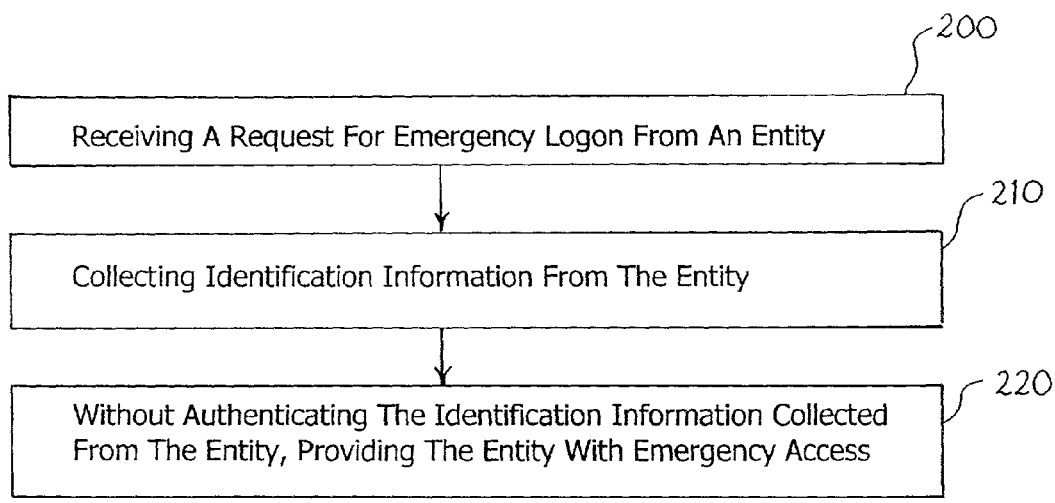
FIG. 2 is a flow chart of a method of a preferred embodiment for emergency logon.

There are some situations in which it is desired to provide access to unauthenticated entities—entities who have forgotten or otherwise cannot provide a recognized username-password combination. To accommodate this desire, the logon process of this preferred embodiment includes an emergency logon feature, which will be illustrated in conjunction with the flowchart shown in FIG. 2. If an entity desires access without entering a valid username and password, the entity can request emergency logon (act 200). In this preferred embodiment, the logon screen 100 displays an emergency logon button 110, and the entity requests emergency logon by clicking this button 110. Other techniques can be used to request emergency logon. For example, emergency logon can be requested by pressing a dedicated key on a keyboard, pressing a shortcut key sequence (e.g., control-alt-E), selecting an emergency logon option from a pull-down menu, or speaking the request into a voice input and recognition unit (e.g., speaking "emergency" into a microphone connected to a workstation with voice recognition software). Additionally, instead of requiring the entity to take an active step, emergency logon can be automatically requested whenever the logon process fails to authenticate an entity (e.g., when an unrecognized username and/or password is provided). Other ways of requesting emergency logon can be used, some of which are described below.

After the request for emergency logon is received, identification information is collected from the entity (act 210). (As described below, this information will be referred to as "unauthenticated identification information" because, although the information identifies the entity, it is not checked against a database of known entities (i.e., it is not authenticated.) This information can be used by an administrator or other personnel to identify who invoked the emergency logon, thereby providing a level of accountability. The identification information collected in act 210 can be identical to the identification information used by the logon process during normal logon. For example, if the identification information used during normal logon is an entity's username, the identification information collected for emergency logon can also be the entity's username. Alternatively, the identification information collected in act 210 can be different from the identification information used during normal logon but still of the same form (e.g., both strings of characters). For example, if the entity's username is "jsmith," the identification information collected in act 210 can be "John Smith." Further, the identification information collected in act 210 can be of a different form from that used during normal logon. For example, if the identification information used during normal logon is a string of alphanumeric characters, the identification information collected in act 210 can be the entity's fingerprint.

As noted above, the identification information collected in act 210 (the unauthenticated identification information) can take any suitable form. For example, the unauthenticated identification information can be a string of one or more characters. Unauthenticated identification information can also comprise biometric information. Biometric information refers to a physical feature or a repeatable action of an individual, such as, but not limited to, hand geometry, retinal scan, iris scan, fingerprint patterns, facial characteristics (e.g., a digital picture or "snapshot"), DNA sequence characteristics, voice prints, and a hand-written signature. Unauthenticated identification information can also be provided via a physical item (a "token"), such as a memory device. Any of the forms described above can also be used as identification information and/or authentication information for a normal logon.

While identification information can be collected from an entity after the request for emergency logon has been received, this information can also be collected before the request for emergency logon is received. For example, if the entity typed in his username prior to clicking the emergency logon button 110, such as when the entity typed in a valid username but an invalid password, the logon process can use that previously-entered username as the identification information referenced in act 210. The same is true if a valid password but invalid username was entered. Identification information can also be collected at the same time the request for emergency logon is made. Consider, for example, the situation in which a username and password are used to authenticate an entity during normal logon, and an entity's fingerprint is used to identify the entity for emergency logon. If a fingerprint detector is used exclusively for emergency logon (or is at least not used for normal logon), then the act of placing a finger on the fingerprint detector can both request emergency logon and provide identification information. Accordingly, the attempt to provide identification information via the fingerprint detector is itself a request for emergency logon. As is clear from these alternatives, although act 210 is shown as following act 200 in the flowchart in FIG. 2, those acts can be performed in any order or can be performed simultaneously. Accordingly, the acts recited in the following claims should not be read as requiring a specific order.

Next, without authenticating the identification information collected from the entity, the logon process provides the entity with emergency access (act 220). The phrase "without authenticating the identification information collected from the entity" refers to the fact that the identification information collected from the entity in act 210 is not authenticated by authentication information. (As described above, because the information collected from the entity in act 210 is not authenticated by authentication information, it is referred to herein as "unauthenticated identification information.") "Emergency access" can be the same access that is provided by the logon process when identification information is authenticated by authentication information ("normal access"). Alternatively, emergency access can be a different form of access. For example, emergency access can provide a sub-set of features offered in normal access, such as read-only access instead of read/write access.

By using the emergency logon method of this preferred embodiment, an entity that cannot provide a valid username and password (i.e., an unauthenticated entity) can be provided emergency access. There are several advantages associated with the emergency logon method of this preferred embodiment. First, this emergency logon method does not require an entity desiring emergency access to remember or find out a reserved username and password. Accordingly, there is no danger of an entity forgetting or being unable to receive a reserved username and password combination, as in prior approaches. Additionally, because the emergency logon process of this preferred embodiment collects identification information from an entity, an administrator will know the identity of the entity who invoked the emergency logon, unlike prior approaches that use a reserved username and password such as "emergency" "emergency."

There are several alternatives that can be used with this preferred embodiment. For example, an administrator can be alerted regarding the request for emergency logon. An alert regarding the request for emergency logon can notify the administrator that emergency logon has been requested or that emergency access has been provided. This allows the emergency logon process to serve a similar purpose to that of an emergency exit door that is wired to an alarm and labeled with a sign that reads "Emergency exit only—alarm will sound." The door lets an individual who does not know how else to get out of the building to take it upon himself to decide that he needs to exit. However, when the door is used, the alarm notifies the authorities that someone left by the emergency exit.

If the alert is generated after identification information is collected from the entity, the identification information can be included in the alert. Other information can be included in the alert as well, such as the time the request for emergency logon was received or the time emergency access was provided. The alert can be generated at any time, for example, immediately or some time after the request is received or immediately or some time after emergency access is provided. The alert can be provided in any suitable form. For example, an alert can be provided in the form of an on-screen dialog box sent to a server machine and displayed to an administrator as a scheduled task. An alert can also take the form of a printed report, a fax, a telephone call, an email, or a page. The form of the alert can be chosen according to how quickly the information is to be given to the administrator.

Additionally, an audit log can be produced that tracks some or all of the actions that an entity took after being provided access. This creates a trail to ensure that the actions of an entity can be traced to that entity, thereby providing a level of accountability. If audit logs are also produced for normal access, it is preferred that the audit log produced for emergency logon be more detailed. This additional detail provides more "footprints" to compensate for the unauthenticated logon.

More generally, if a workstation is considered as operating in a first operating mode when identification information is authenticated by authentication information, the workstation can be considered as operating in a second operating mode after emergency logon. The second operating mode can be different from the first operating mode in any of the above-described ways or in other ways not described above. For example, in the second operating mode, an administrator can be alerted regarding the request for emergency logon, an audit log can be produced that is more detailed than an audit log produced in the first operating mode, and/or a sub-set of features offered in normal access can be provided.

The emergency logon embodiments described above can be used in any suitable environment, such as on a stand-alone general-purpose computer, a workstation in a network environment, or any other device that uses a logon process. These preferred embodiments find particular utility in making a computer-based medical information system compliant with the Health Insurance Portability and Accountability Act (HIPAA) of 1996. HIPAA can be interpreted as requiring a logon process for a computer-based medical information system that prevents unauthorized entities from gaining access but does not prevent a health care provider from obtaining necessary information from the system during a crisis. These preferred embodiments can be used to ensure that, in accordance with HIPAA, the logon process will not prevent a heath care provider from providing health care.

A computer-based medical information system includes a workstation that can access medical data. One suitable computer-based medical information system is the KinetDx™ system available from Acuson Corporation of Mountain View, Calif. "Medical data" refers to a medical image and/or a medical report. A "medical image" refers to a still or moving image generated by a diagnostic medical image acquisition device. A diagnostic medical image acquisition device can use any suitable imaging modality, including, but not limited to, ultrasound, computed radiography, magnetic resonance, angioscopy, color flow Doppler, cystoscopy, diaphanography, echocardiography, fluoresosin angiography, laparoscopy, magnetic resonance angiography, positron emission tomography, single-photon emission computed tomography, x-ray angiography, computed tomography, nuclear medicine, biomagnetic imaging, culposcopy, duplex Doppler, digital microscopy, endoscopy, fundoscopy, laser surface scan, magnetic resonance spectroscopy, radiographic imaging, thermography, and radio fluroscopy. (The emergency logon process can also be implemented on a diagnostic medical image acquisition device, such as an ultrasound system.) A "medical report" refers to any non-image medical data, such as a worksheet or a textual and/or graphical presentation of information such as patient demographics, measurements, comments, and/or diagnoses.

Figure 3:
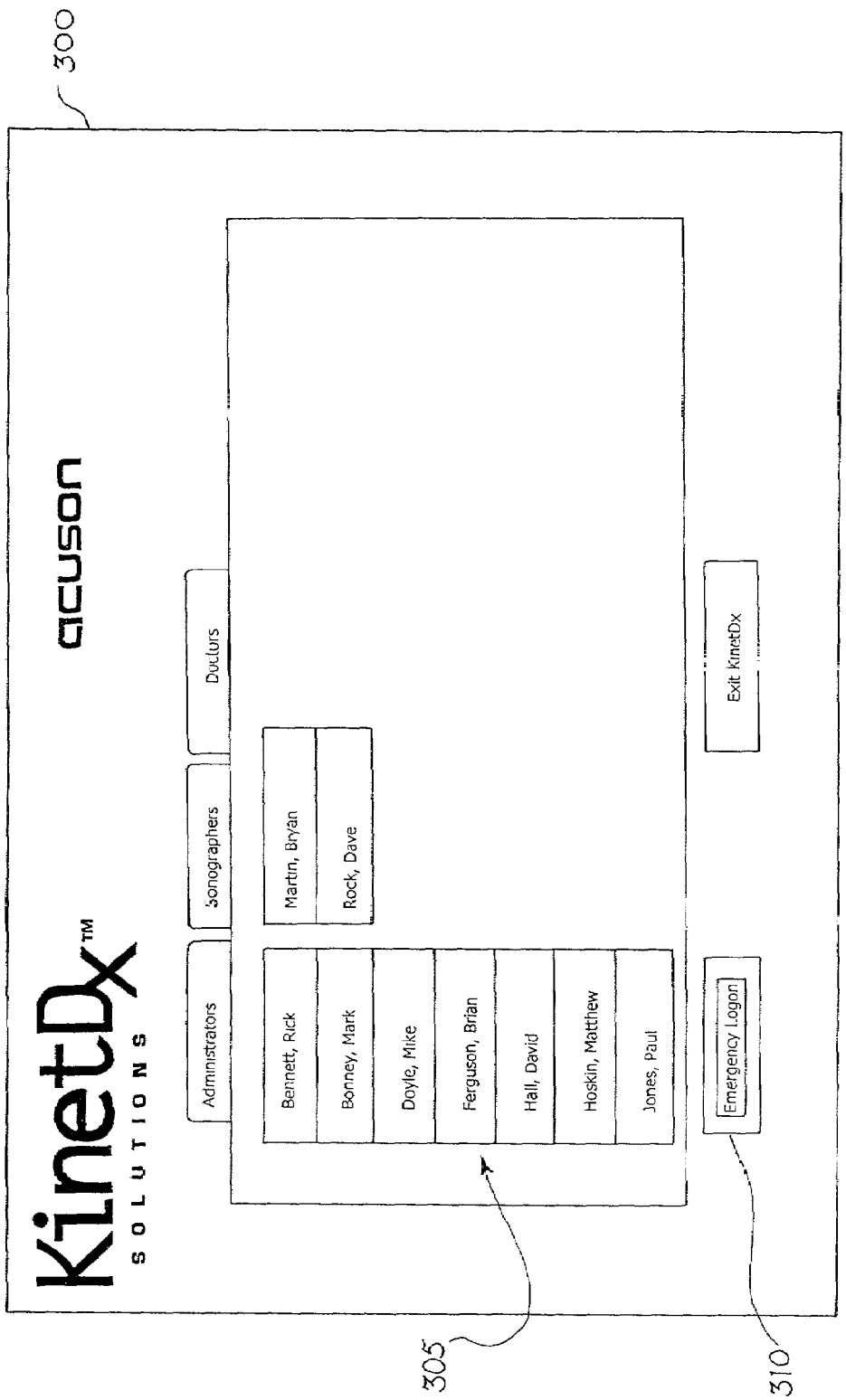
FIG. 3 is an illustration of a logon screen of a logon process of another preferred embodiment.

Turning again to the drawings, FIG. 3 is an illustration of a logon screen 300 displayed on a workstation of a computer-based medical information system. In this preferred embodiment, the logon screen 300 is presented to the entity when the medical review software on the workstation is executed. Accordingly, the logon screen 300 restricts access to the medical review software but does not restrict access to the other applications and resources on the workstation. Alternatively, the logon screen 300 can be displayed when the workstation is turned on to restrict access to all resources on the workstation, not merely the medical review software. As another alternative, the logon screen 300 can be displayed prior to allowing access to a specific feature of the medical review software.

The logon screen 300 contains a set of buttons 305 with the names of doctors, as designated by the "Doctors" label on the displayed folder. Additional sets of buttons are displayed when the "Administrators" and "Sonographers" tabs are selected. Unlike the logon screen 100 in FIG. 1, the logon screen 300 of this preferred embodiment does not require the entity to type in his username. Rather, the entity identifies himself by clicking on the button displaying his name. The entity will then be asked to provide authentication information, such as a password. If the entered password matches the password associated with the selected doctor's name, the entity will be granted access.

Figure 4:
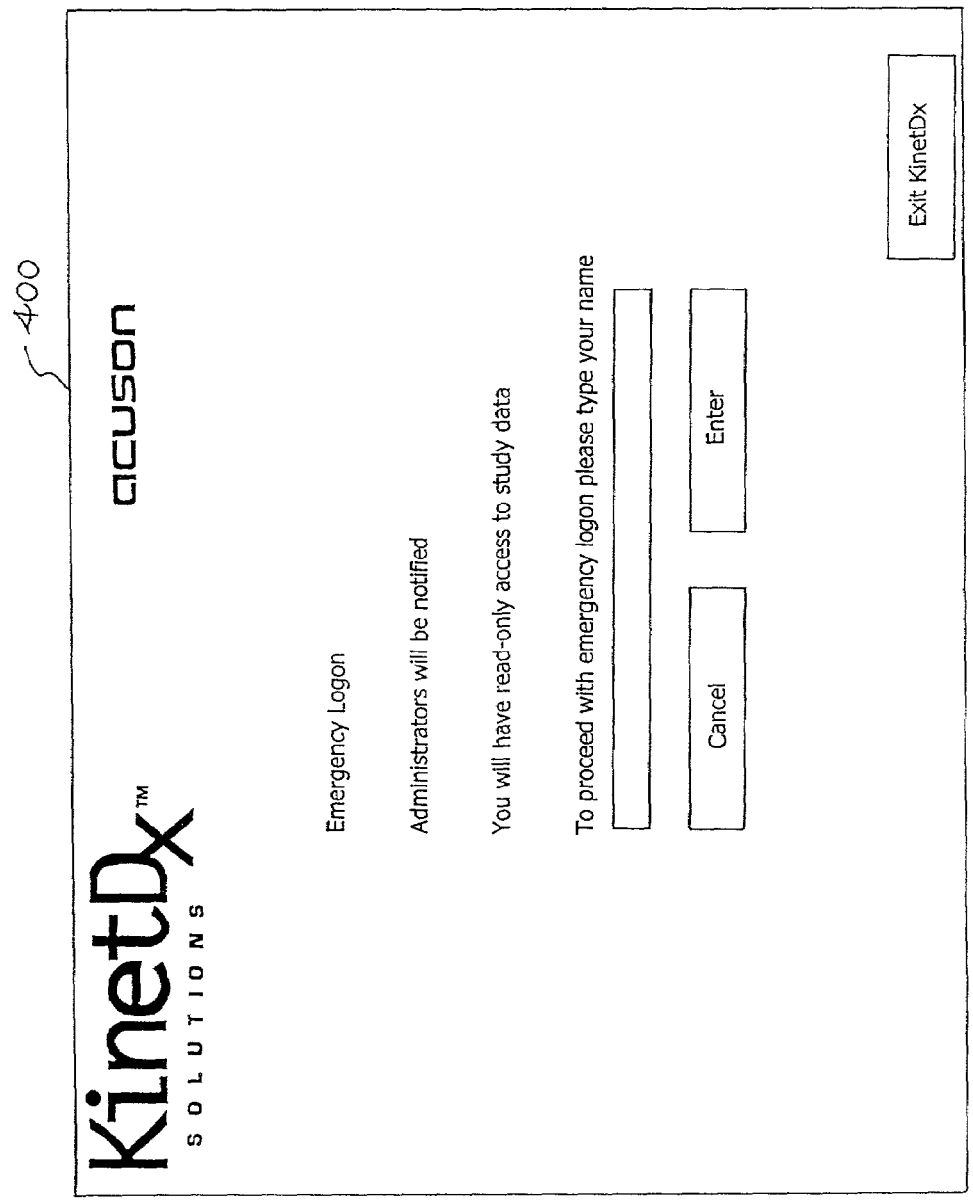
FIG. 4 is an illustration of a dialog screen of a preferred embodiment requesting unauthenticated identification information from an entity.

The logon screen 300 also contains an emergency logon button 310. When the emergency logon button 310 is clicked, a dialog screen appears 400 (see FIG. 4) warning the entity about what it means to invoke an emergency logon (here, that an administrator will be notified and that the entity will have read-only access to study data). The dialog screen 400 also requests and collects unauthenticated identification information (here, the entity's name). The entity can either sign in by typing his name or cancel the emergency logon. If the entity types in his name, he will be given emergency access, which here is read-only access to medical data. The entity can also be given a sub-set of the privileges given to an entity in normal access, such as merging studies together, splitting a study in two, marking a study as read/diagnosed, deleting an image or study, faxing a report to a referring physician, and exporting data to a removable disc.

An audit log with more detail than that used in an audit log produced for a normal logon can also be created. Audit logs are often generated by medical review stations so that hospital personnel can answer patients' questions regarding who looked at their data and when. Typically, an entry is entered into the audit log every time an entity accesses a patient's study ("Dr. Harrison opened Study No. 1234 at 3:30 p.m.") or changes a patient's study ("Dr. Harrison deleted images from Study No. 1234 at 3:45 p.m."). Preferably, the audit logs produced for emergency access are more detailed. For example, instead of "Dr. Harrison opened Study No. 1234 at 3:30 p.m.," the entry can read "Dr. Harrison opened Study No. 1234 at 3:30 p.m. and looked at images 10–18." Entries to track information not normally tracked, such as which tools (e.g., a linear measurement tool) were used, can also be added to the audit log.

In one preferred embodiment, the computer-based medical information system is implemented in a network 500 (see FIG. 5). The network 500 comprises a plurality of workstations 510, a local area network (LAN) 520, a medical information database server 530, a domain server 540, and a network server 550. Although shown separated in FIG. 55, the domain server 540 and the medical information database server 530 can reside on the same machine. The medical information database server 530 stores medical data, and the workstations 510 are the network portal to that medical data and other resources available through the LAN 520. The domain server 540 contains a security database of known users and their passwords, and the network server 550 stores an audit log, which is contributed to by the workstations 510. A similar network can be used for systems other than computer-based medical information systems.

To access the medical data stored in the medical information database server 530, an entity logs onto one of the workstations 510, which are connected to the medical information database server 530 through the LAN 520. In this way, the entity is logging onto a network of resources, and the workstation is his network portal to the stored medical data. In operation, an entity encounters a logon screen and enters identification and authentication information (e.g., a username and password). During the logon process, the workstation communicates with the remotely-located domain server 540 via the LAN 520 to authenticate the entity by checking the entered username and password against the security database of known users and their passwords. If there is a match, the entity is granted access. When an entity invokes an emergency logon, the workstation grants emergency access to the network without using the domain server 540 for authentication. The actions taken by the entity who is granted emergency access are sent from the workstation to the centrally-located network server 550, which records those actions in an audit log.

It is intended that the foregoing detailed description be understood as an illustration of selected forms that the invention can take and not as a definition of the invention. It is only the following claims, including all equivalents, that are intended to define the scope of this invention.

What is claimed is:

1. A method for facilitating emergency logon for a healthcare provider, the method comprising:
    (a) providing a logon process that collects entity identification information and entity authentication information and provides access when entity identification information is authenticated by entity authentication information;
    (b) receiving a request for emergency logon from said healthcare provider, different to said entity;
    (c) collecting identification information from the healthcare provider; and
    (d) without authenticating the identification information collected from the healthcare provider, providing the healthcare provider with emergency access.

2. The method of claim 1 further comprising:
    (e) alerting an administrator regarding the request for emergency logon.

3. The method of claim 1 further comprising:
    (e) producing an audit log that is more detailed than an audit log produced when identification information is authenticated by authentication information.

4. The method of claim 1, wherein the emergency access provided to the healthcare provider in (d) is the same as the access provided when identification information is authenticated by authentication information.

5. The method of claim 1, wherein the emergency access provided to the healthcare provider in (d) is different from the access provided when identification information is authenticated by authentication information.

6. The method of claim 5, wherein emergency access provides read-only access, and wherein access provided when identification information is authenticated by authentication information is not limited to read-only access.

7. The method of claim 1, wherein the healthcare provider requests emergency logon by clicking on a displayed emergency logon button.

8. The method of claim 1, wherein the information collected from the healthcare provider in (c) comprises at least one character.

9. The method of claim 1, wherein the information collected from the healthcare provider in (c) comprises biometric information.

10. The method of claim 1, wherein the method for emergency logon is implemented on a computer-based medical information system.

11. A method for facilitating emergency logon for a healthcare provider, the method comprising:
    (a) providing a workstation comprising a logon process that collects entity identification information and entity authentication information and operates in a first operating mode when entity identification information is authenticated by entity authentication information;
    (b) receiving a request for emergency logon from said healthcare providers different to said entity;
    (c) collecting identification information from the healthcare provider; and
    (d) without authenticating the identification information collected from the healthcare provider, operating the workstation in a second operating mode, the second operating mode being different from the first operating mode.

12. The method of claim 11, wherein, in the second operating mode, an administrator is alerted regarding the request for emergency logon.

13. The method of claim 11, wherein, in the second operating mode, an audit log is produced that is more detailed than an audit log produced in the first operating mode.

14. The method of claim 11, wherein, in the second operating mode, read-only access is provided to data; and wherein, in the first operating mode, access to data is not limited to read-only access.

15. The method of claim 11, wherein the healthcare provider requests emergency logon by clicking on a displayed emergency logon button.

16. The method of claim 1 wherein the information collected from the healthcare provider in (c) comprises at least one character.

17. The method of claim 11, wherein the information collected from the healthcare provider in (c) comprises biometric information.

18. The method of claim 11, wherein the method for emergency logon is implemented on a computer-based medical information system.

19. A method for facilitating emergency logon for a healthcare provider, the method comprising:
    (a) providing a computer-based medical information system comprising a logon process that collects entity identification information and entity authentication information and provides access to medical data when entity identification information is authenticated by entity authentication information;
    (b) displaying an emergency logon button;
    (c) receiving a selection of the emergency logon button from said healthcare provider, different to said entity;
    (d) collecting identification information from the healthcare provider;
    (e) without authenticating the identification information collected from the healthcare provider, providing the healthcare provider with read-only access to the medical data; and alerting an administrator regarding the request for emergency logon.

20. The method of claim 19 further comprising;
(g) producing an audit log that is more detailed than an audit log produced when identification information is authenticated by authentication information.

21. The method of claim 19, wherein the computer-based medical information system comprises a plurality of workstations, a local area network, a medical information database server, a domain server, and a network server.

22. A system having an emergency logon feature for a healthcare provider, the system comprising:
an application executable on a processing device for:
collecting entity identification information and entity authentication information and providing access when entity identification information is authenticated by entity authentication information;
receiving a request for emergency logon from said healthcare provider, different to said entity;
collecting identification information from the healthcare provider; and
without authenticating the identification information collected from the healthcare provider, providing the healthcare provider with emergency access.

23. The system of claim 22 wherein the application executable in the processing device is
for alerting an administrator regarding the request for emergency logon.

24. The system of claim 22 wherein the application executable in the processing device is
for producing an audit log that is more detailed than an audit log produced when identification information is authenticated by authentication information.

25. The system of claim 22, wherein the emergency access provided to the entity is the same as the access provided when identification information is authenticated by authentication information.

26. The system of claim 22, wherein the emergency access provided to the healthcare provider is different from the access provided when identification information is authenticated by authentication information.

27. The system of claim 26, wherein emergency access provides read-only access, and wherein access provided when identification information is authenticated by authentication information is not limited to read-only access.

28. The system of claim 22, wherein the healthcare provider requests emergency logon by clicking on a displayed emergency logon button.

29. The system of claim 22, wherein the information collected from the healthcare provider comprises at least one character.

30. The system of claim 22, wherein the information collected from the healthcare provider comprises biometric information.

31. The system of claim 22, wherein the system comprises a computer-based medical information system.

* * * * *